United States Patent
Zhang et al.

(10) Patent No.: US 12,174,715 B2
(45) Date of Patent: Dec. 24, 2024

(54) DEEP LEARNING METHOD INTEGRATING PRIOR KNOWLEDGE FOR FAULT DIAGNOSIS

(71) Applicant: Hefei University of Technology, Anhui (CN)

(72) Inventors: Qiang Zhang, Anhui (CN); Ting Huang, Anhui (CN); Shanlin Yang, Anhui (CN); Xianghong Hu, Anhui (CN); Chunhui Wang, Anhui (CN); Yuanhang Wang, Anhui (CN); Xiaojian Ding, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 17/797,133

(22) PCT Filed: Oct. 27, 2021

(86) PCT No.: PCT/CN2021/126687
§ 371 (c)(1),
(2) Date: Aug. 3, 2022

(87) PCT Pub. No.: WO2022/188425
PCT Pub. Date: Sep. 15, 2022

(65) Prior Publication Data
US 2024/0184678 A1 Jun. 6, 2024

(30) Foreign Application Priority Data
Mar. 11, 2021 (CN) .......................... 202110266124.4

(51) Int. Cl.
*G06F 11/22* (2006.01)
(52) U.S. Cl.
CPC ............................... *G06F 11/2263* (2013.01)

(58) Field of Classification Search
CPC ................................................... G06F 11/2263
(Continued)

(56) References Cited

U.S. PATENT DOCUMENTS

| 2021/0102197 A1* | 4/2021 | Sabeti | G16B 40/20 |
| 2021/0334656 A1* | 10/2021 | Sjögren | G06N 3/04 |
| 2022/0405480 A1* | 12/2022 | Huang | G06F 40/166 |

FOREIGN PATENT DOCUMENTS

CN 109814523 A 5/2019

OTHER PUBLICATIONS

Wikipedia CNN page retrieved from https://en.wikipedia.org/wiki/Convolutional_neural_network (Year: 2024).*

* cited by examiner

*Primary Examiner* — Yair Leibovich (57) ABSTRACT

A deep learning fault diagnosis method includes the following steps: a fault diagnosis data set X is processed based on sliding window processing, to obtain a picture-like sample data set $\tilde{X}$, and obtain an attention matrix A of the picture-like sample data set $\tilde{X}$; and a 2D-CNN model is constructed to process the picture-like sample data set $\tilde{X}$ to obtain a corresponding feature map F, and in the meantime, the feature map F is processed based on channel-oriented average pooling and channel-oriented maximum pooling to obtain an output $P_1$ of the average pooling and an output $P_2$ of the maximum pooling, and a weight matrix W is obtained based on the attention matrix A, the output $P_1$ of the average pooling, and the output $P_2$ of the maximum pooling, so that an output of the model is a feature map $\tilde{F}$ based on an attention mechanism, where $\tilde{F}=WF$.

8 Claims, 4 Drawing Sheets

(58) Field of Classification Search
USPC .......................................................... 714/26
See application file for complete search history.

DEEP LEARNING METHOD INTEGRATING PRIOR KNOWLEDGE FOR FAULT DIAGNOSIS

TECHNICAL FIELD

The present invention relates to the technical field of fault diagnosis, and in particular to a deep learning fault diagnosis method incorporating a priori knowledge.

BACKGROUND ART

The development of a sensor technology has enabled enterprises to collect fault data conveniently, economically, and quickly. Due to the superiority of a deep learning technology in extracting predictable features from the fault data, its application in the fault diagnosis has achieved remarkable results.

A fault diagnosis method based on deep learning mainly has the following steps:

1) data acquisition: acquiring the fault data in an actual production process through the sensor technology;
2) data preprocessing: performing operations such as supplementing, enhancing, cleaning, or transforming on the acquired raw data to improve quality of the data and make it applicable to the input requirements of the deep learning method;
3) model architecture construction: designing a deep learning model architecture based on characteristics of the problem;
4) model training: training the model by a back-propagation algorithm using a preprocessed training set;
5) model testing: testing the model based on the FDR and FPR metrics using a preprocessed test set; if test results meet the requirements, proceeding to 6), and if the test results do not meet the requirements, proceeding to 3); and
6) fault diagnosis: the model that has completed the test can predict a new data sample, and a state of the data sample can be determined (whether it is a fault; if it is a fault, what class of fault it belongs to) based on the prediction result.

The existing specific deep learning fault diagnosis methods are usually the embodiment of the above six steps. Among the above steps, the main ones affecting the performance of the deep learning fault diagnosis method are step 1), step 2), and step 3). The quality of the data obtained in step 1) directly affects the performance of a final model; suitable preprocessing methods in step 2) can further improve the quality of the data; and the model architecture designed in step 3) needs to be applicable to a specific problem, and if the design is not proper, an over-fitting or under-fitting problem may occur.

Currently, the fault diagnosis methods based on the deep learning technology have two problems as follows:

1) in practice, the system is not allowed to operate continuously in a fault state, and therefore, an amount of fault data acquired is generally not large; however, the deep learning technology is highly dependent on the amount of data, which makes it difficult to apply the deep learning technology to fault diagnosis in practical scenarios; and
2) in order to ensure the reliability of fault diagnosis results, it is generally required that the fault diagnosis method is interpretable. However, deep learning is a type of "black box" technology, and its interpretability is very low, which also restricts the application of the deep learning technology in fault diagnosis.

SUMMARY OF THE INVENTION

The present invention provides a deep learning fault diagnosis method incorporating a priori knowledge, to overcome one or more defects of the prior art.

A deep learning fault diagnosis method incorporating a priori knowledge according to the present invention includes the following steps:

step S1, data processing:
in the step, a fault diagnosis data set X is processed based on sliding window processing, to obtain a picture-like sample data set $\tilde{X}$, and obtain an attention matrix A of the picture-like sample data set $\tilde{X}$; and step S2, model architecture construction:
in the step, a 2D-CNN model is constructed to process the picture-like sample data set $\tilde{X}$ to obtain a corresponding feature map F, and in the meantime, the feature map F is processed based on channel-oriented average pooling and channel-oriented maximum pooling to obtain an output $P_1$ of the average pooling and an output $P_2$ of the maximum pooling, and a weight matrix W is obtained based on the attention matrix A, the output $P_1$ of the average pooling, and the output $P_2$ of the maximum pooling, so that an output of the model is a feature map $\tilde{F}$ based on an attention mechanism, where $\tilde{F}=WF$.

In the present invention, the a priori knowledge can be better incorporated into the constructed model by constructing the attention matrix A, thereby enabling the method in the present invention to extract predictable features from the data in a targeted manner, that is, to better obtain more effective information from a small amount of data, so that the method can better improve the accuracy of fault diagnosis and can be better applied to the application scenarios with a small amount of data. In addition, since the incorporation of a priori knowledge can better improve the interpretability of the whole model, the reliability of the fault diagnosis can be better improved.

Preferably, in step S1, $X=\{X_i | i=1, \ldots, M\}$, $X_i \in R^{T \times N}$, $X_i$ is a multi-attribute time series of an $i^{th}$ class of fault, $X_i$ is used to record values of different attributes at different times, M is the total number of fault classes, T is a length of the time series, and N is the total number of attributes. In the present invention, a corresponding data set $X_i$ can be created for each different fault class, and the data set can be obtained from data in actual production, thus better facilitating the subsequent model construction, training, and testing.

Preferably, in step S1, $$\tilde{X} = \left\{ \tilde{X}_{ij} \mid i = 1, \ldots, M; j = 1, \ldots, \left\lfloor \frac{T-D}{\lambda} \right\rfloor \right\}, \tilde{X}_{ij} \in R^{D \times N},$$

$\tilde{X}_{ij}$ represents a $j^{th}$ sample set of the $i^{th}$ class of fault, D is a width of a sliding window, $\lambda$ is a step size of the sliding window, and $\lfloor * \rfloor$ is a rounding up operation. Since the 2D-CNN is used as a basic deep learning architecture in the present invention, when the fault diagnosis data set X in the present invention is multi-attribute time series data, the fault diagnosis data set cannot be directly used as an input to the 2D-CNN, and the fault diagnosis data set X can be better converted into picture-like data through sliding window processing on it, so that the input to the 2D-CNN can be better implemented.

Preferably, an attention matrix corresponding to each sample set $\tilde{X}_{ij}$ is $A_{ij}$, $A_{ij} \in R^{D \times N}$, and the attention matrix $A_{ij}$ is a 0-1 matrix and is used to characterize a priori knowledge. Thus, the a priori knowledge can be better characterized.

Preferably, the attention matrix $A_{ij}$ for each sample set $\tilde{X}_{ij}$ is obtained through threshold characterization, that is, for the $j^{th}$ sample set $\tilde{X}_{ij}$ of the $i^{th}$ class of fault, a value of each element in the sample set $\tilde{X}_{ij}$ one by one is denoted as 1 when it reaches a threshold enough to characterize that the $i^{th}$ fault has occurred, otherwise it is denoted as 0, and then the corresponding attention matrix $A_{ij}$ can be obtained. Thus, the a priori knowledge can be better characterized.

Preferably, in step S2, all the sample sets $\tilde{X}_{ij}$ are processed one by one based on the 2D-CNN model in a case of keeping the number of rows and the number of columns unchanged after processing, an output of the sample set $\tilde{X}_{ij}$ is a feature map $F_{ij}$, $F_{ij}=[F_{ij1}, \ldots, F_{ijK}]$, and K is the number of channels of the 2D-CNN model. Thus, the final weight matrix can be better obtained.

Preferably, in step S2, for the sample set $\tilde{X}_{ij}$, a calculation formula of an output $P_{ij1}$ of its average pooling is $$P_{ij1}[d, n] = s\left(\frac{1}{K}\sum_{k=1}^{K} F_k[d, n]\right), d = 1, \ldots, D; n = 1, \ldots, N;$$

and a calculation formula of an output $P_{ij2}$ of its maximum pooling is $$P_{ij2}[d, n] = s\left(\max_{k \in \{1, \ldots, K\}} F_k[d, n]\right), d = 1, \ldots, D; n = 1, \ldots, N.$$

Therefore, the corresponding outputs of the average pooling and the maximum pooling can be better obtained.

Preferably, in step S2, for the feature map $F_{ij}$, a calculation formula of its weight matrix $W_{ij}$ is $$Y = A_{ij} + P_1 + P_2;$$

$$W[d, n] = \frac{e^{Y[d,n]}}{\sum_{d=1}^{D}\sum_{n=1}^{N} e^{Y[d,n]}},$$

where $W[d, n]$ represents a value of row d and column n in the matrix $W_{ij}$, and $Y[d, n]$ represents a value of row d and column n in a matrix Y.

Through the above, the model constructed in the present invention can better output the feature map incorporating the a priori knowledge, so as to better incorporate the a priori knowledge.

DETAILED DESCRIPTION OF EMBODIMENTS

In order to further understand the content of the present invention, the present invention will be described in detail with reference to the accompanying drawings and the embodiments. It should be understood that the embodiments are only for explaining but not for limiting the present invention.

Embodiment 1

Figure 1:
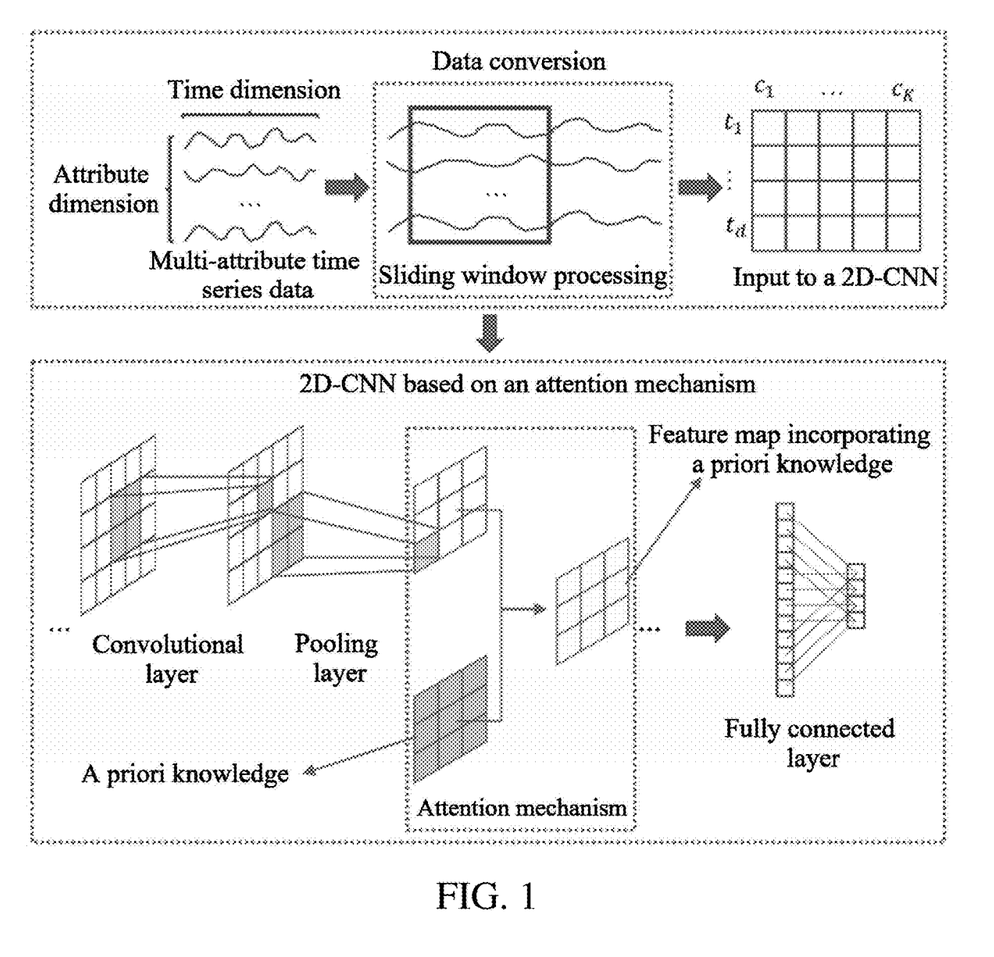
FIG. 1 is a schematic diagram of a system architecture of a deep learning fault diagnosis method in Embodiment 1.
Figure 2:
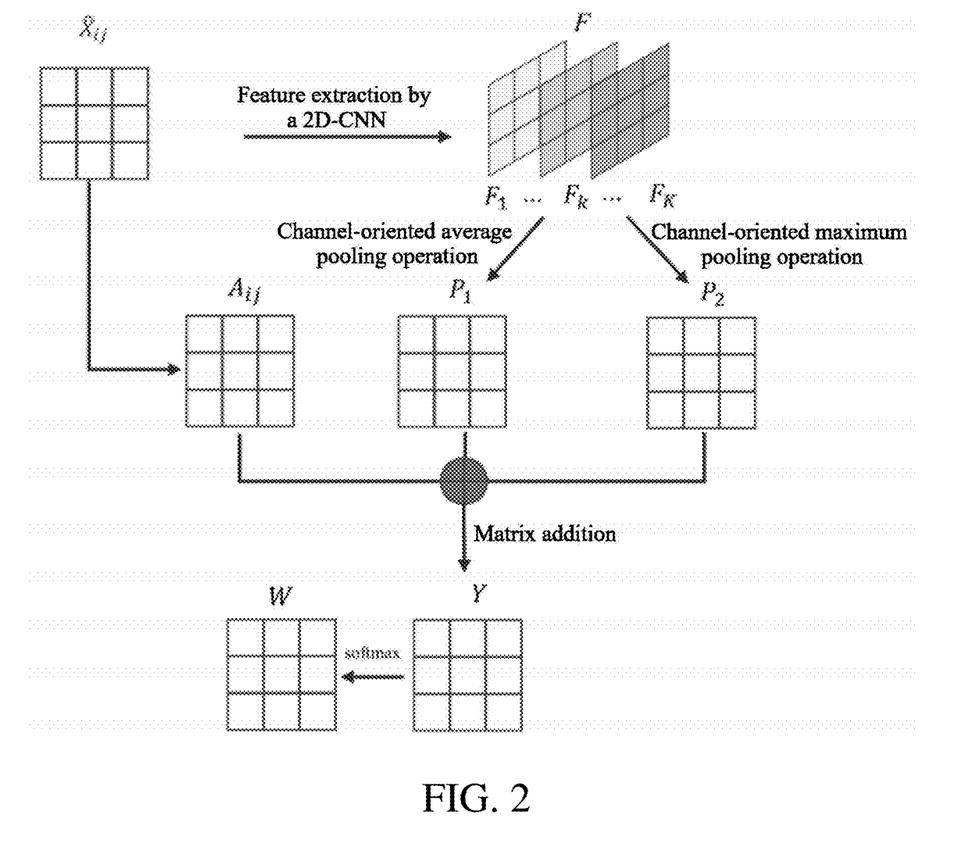
FIG. 2 is a schematic flowchart of data processing of the deep learning fault diagnosis method in Embodiment 1.

As shown in FIGS. 1 and 2, this embodiment provides a deep learning fault diagnosis method incorporating a priori knowledge, and the method includes the following steps:

step S1, data processing:
  in the step, a fault diagnosis data set X is processed based on sliding window processing, to obtain a picture-like sample data set $\tilde{X}$, and obtain an attention matrix A of the picture-like sample data set $\tilde{X}$; and
step S2, model architecture construction:
  in the step, a 2D-CNN model is constructed to process the picture-like sample data set $\tilde{X}$ to obtain a corresponding feature map F, and in the meantime, the feature map F is processed based on channel-oriented average pooling and channel-oriented maximum pooling to obtain an output $P_1$ of the average pooling and an output $P_2$ of the maximum pooling, and a weight matrix W is obtained based on the attention matrix A, the output $P_1$ of the average pooling, and the output $P_2$ of the maximum pooling, so that an output of the model is a feature map $\tilde{F}$ based on an attention mechanism, where $\tilde{F}=WF$.

In this embodiment, the a priori knowledge can be better incorporated into the constructed model by constructing the attention matrix A, thereby enabling the method in this embodiment to extract predictable features from the data in a targeted manner, that is, to better obtain more effective information from a small amount of data, so that the method can better improve the accuracy of fault diagnosis and can be better applied to the application scenarios with a small amount of data. In addition, since the incorporation of a priori knowledge can better improve the interpretability of the whole model, the reliability of the fault diagnosis can be better improved.

In addition, in this embodiment, the constructed weight matrix W is composed of the attention matrix A, the output $P_1$ of the average pooling, and the output $P_2$ of the maximum pooling together, i.e., it can better consider both the a priori knowledge (represented by the attention matrix A) and the features extracted after pooling, so that the interpretability of the data output results is higher.

In step S1 of this embodiment, $X=\{X_i | i=1, \ldots, M\}$, $X_i \in R^{T \times N}$, $X_i$ is a multi-attribute time series of an $i^{th}$ class of fault, $X_i$ is used to record values of different attributes at different times, M is the total number of fault classes, T is a length of the time series, and N is the total number of attributes. In this embodiment, a corresponding data set $X_i$ can be created for each different fault class, and the data set can be obtained from data in actual production, thus better facilitating the subsequent model construction, training, and testing.

In step S1 of this embodiment, $$\tilde{X} = \left\{ \tilde{X}_{ij} \mid i = 1, \ldots, M; j = 1, \ldots, \left\lfloor \frac{T-D}{\lambda} \right\rfloor \right\}, \tilde{X}_{ij} \in R^{D \times N},$$

$\tilde{X}_{ij}$ represents a $j^{th}$ sample set of the $i^{th}$ class of fault, D is a width of a sliding window, $\lambda$ is a step size of the sliding window, and $\lfloor * \rfloor$ is a rounding up operation. Since the 2D-CNN is used as a basic deep learning architecture in this embodiment, when the fault diagnosis data set X in this embodiment is multi-attribute time series data, the fault diagnosis data set cannot be directly used as an input to the 2D-CNN, and the fault diagnosis data set X can be better converted into picture-like data through sliding window processing on it, so that the input to the 2D-CNN can be better implemented.

In the patent with Chinese patent No. "201811472378.6", a method for performing sliding window processing on multi-attribute time series data has been disclosed. Therefore, it is not repeated in this embodiment.

In this embodiment, an attention matrix corresponding to each sample set $\tilde{X}_{ij}$ is $A_{ij}$, $A_{ij} \in R^{D \times N}$, and the attention matrix $A_{ij}$ is a 0-1 matrix and is used to characterize a priori knowledge. Thus, the a priori knowledge can be better characterized.

In this embodiment, the attention matrix $A_{ij}$ for each sample set $\tilde{X}_{ij}$ is obtained through threshold characterization, that is, for the $j^{th}$ sample set $\tilde{X}_{ij}$ of the $i^{th}$ class of fault, a value of each element in the sample set $\tilde{X}_{ij}$ one by one is denoted as 1 when it reaches a threshold enough to characterize that the $i^{th}$ fault has occurred, otherwise it is denoted as 0, and then the corresponding attention matrix $A_{ij}$ can be obtained. Thus, the a priori knowledge can be better characterized.

The a priori knowledge that defines a fault diagnosis in this embodiment is a characteristic that reflects a mechanism of fault occurrence. For a certain system, it can be determined that a certain class of failure occurs in the system when the value of an observed variable reaches (reaches or falls below) a certain threshold according to theory or experience. This threshold in the determination process can be used to characterize the a priori knowledge.

Certainly, existing a priori knowledge such as time domain characteristics, frequency domain characteristics, and stationarity of time series can be used for constructing the a priori knowledge in this embodiment.

In this embodiment, any attention matrix $A_{ij}$ only includes 0 and 1, that is, the attention matrix is a 0-1 matrix; Through this configuration, a data area that the 2D-CNN needs to pay attention to can be better characterized, so that the a priori knowledge can be better incorporated.

In step S2 of this embodiment, all the sample sets $\tilde{X}_{ij}$ are processed one by one based on the 2D-CNN model in a case of keeping the number of rows and the number of columns unchanged after processing, an output of the sample set $\tilde{X}_{ij}$ is a feature map $F_{ij}$, $F_{ij} = [F_{ij1}, \ldots, F_{ijK}]$, and K is the number of channels of the 2D-CNN model. Thus, the final weight matrix can be better obtained.

In this embodiment, the 2D-CNN model can be defined as having a convolution kernel size of 3*3 and a step size of 1.

In step S2 of this embodiment, for the sample set $\tilde{X}_{ij}$, a calculation formula of an output $P_{ij1}$ of its average pooling is $$P_{ij1}[d, n] = s\left(\frac{1}{K}\sum_{k=1}^{K} F_k[d, n]\right), d = 1, \ldots, D; n = 1, \ldots, N;$$

and a calculation formula of an output $P_{ij2}$ of its maximum pooling is $$P_{ij2}[d, n] = s\left(\max_{k \in \{1, \ldots, K\}} F_k[d, n]\right), d = 1, \ldots, D; n = 1, \ldots, N.$$

Therefore, the corresponding outputs of the average pooling and the maximum pooling can be better obtained.

In step S2 of this embodiment, for the feature map $F_{ij}$, a calculation formula of its weight matrix $W_{ij}$ is $$Y = A_{ij} + P_1 + P_2;$$

$$W[d, n] = \frac{e^{Y[d,n]}}{\sum_{d=1}^{D} \sum_{n=1}^{N} e^{Y[d,n]}},$$

where $W[d, n]$ represents a value of row d and column n in the matrix $W_{ij}$, and $Y[d, n]$ represents a value of row d and column n in a matrix Y.

Through the above, the model constructed in this embodiment can better output the feature map incorporating the a priori knowledge, so as to better incorporate the a priori knowledge.

In addition, in this embodiment, after being output, the feature map F based on the attention mechanism can be processed through a fully connected layer to obtain an output result, and the model can be trained and tested based on a conventional method.

In this embodiment, through the incorporation of a priori knowledge, the deep learning technology can extract features from the data in a targeted manner, thereby making it applicable to fault diagnosis with a small amount of data; and in addition, the interpretability of deep learning is improved, thereby making it applicable to fault diagnosis with high reliability requirements.

In conclusion, this embodiment solves the problems of a small amount of fault diagnosis data and high reliability requirements by the deep learning technology incorporating the a priori knowledge, thereby further improving the practical application prospect of the deep learning technology in fault diagnosis.

In order to verify the method proposed in this embodiment, this embodiment uses a Tennessee chemical process data set to verify the method in this embodiment.

The Tennessee chemical process is a simulation process based on an operating process of a real chemical company. In the Tennessee chemical process, 41 measured variables and 11 manipulated variables are included. In this embodiment, these 52 variables are all used to construct a fault diagnosis model. The Tennessee chemical process includes 21 classes of fault states and one normal state. For each state, there is training set data and test set data acquired from 52 variables at a frequency of one sample every 3 minutes. Each training set includes 500 samples (the first 20 are normal samples), and each test set includes 960 samples (the first 160 are normal samples).

In the verification of this embodiment, the method disclosed in the Chinese patent with the patent No. "201811472378.6" is used to complete the data processing in step S1, and the width of the sliding window is set to 10 and the step size of the sliding window is set to 1; and therefore, a corresponding data set can better be converted into a picture-like data set.

In step S1 of this embodiment, a Pearson correlation coefficient can be used to obtain the attention matrix $A_{ij}$. Details are as follows:

(1) a Pearson correlation coefficient between each attribute (variable) and each fault is first calculated;
(2) then a threshold r of the correlation coefficient is set and 0<r<1, if a Pearson correlation coefficient between any attribute (variable) and a fault exceeds the threshold r of the correlation coefficient, then the any attribute (variable) is given attention in the diagnosis of the fault, otherwise it is not given attention; if an attribute (variable) is given attention, a corresponding element in the corresponding attention matrix is 1, otherwise it is denoted as 0;
through this, the attention matrix of all attributes in each state (21 fault states and one normal state) can be obtained in turn; and
(3) the attention matrix $A_{ij}$ in this embodiment is an attention matrix corresponding to the sample set $\tilde{X}_{ij}$, which can be better obtained based on the attention matrix of all the attributes in "(2)" above.

Step S1 can preferably be implemented after the above is completed. After completing step S1, the 2D-CNN model can be constructed.

The 2D-CNN model constructed in this embodiment sequentially includes an input layer, a convolutional layer 1 (Conv-1 #), a pooling layer 1 (MaxPool-1), a convolutional layer 2 (Conv-2 #), a pooling layer 2 (MaxPool-2), an attention mechanism layer 1 (Atten-1), a convolution layer 3 (Conv-3 #), a pooling layer 3 (MaxPool-3), an attention mechanism layer 2 (Atten-2), a convolutional layer 4 (Conv-4 #), a pooling layer 4 (MaxPool-4), a fully connected layer (FC-1*), and an output layer (Softmax). Among them, the convolutional layer 1 (Conv-1 #) to the pooling layer 4 (MaxPool-4) constitute a feature extractor, and the fully connected layer (FC-1*) and the output layer (Softmax) constitute a classifier.

In this embodiment, output results of all the convolutional layers are processed by means of batch normalization (BN), which can better speed up the network training.

In this embodiment, the Dropout method is used to process the fully connected layer (FC-1*), so that overfitting can be better avoided. A dropout probability of neurons can be set to p=0.75.

Table 1 shows parameter settings of the 2D-CNN model constructed in this embodiment.

It can be learned from FIG. 2 that when the 2D-CNN model in this embodiment processes data, data input by the input layer can be a sample set $\tilde{X}_{ij}$, which can be output as a feature map $F_{ij}$ after being processed by the convolutional layer 1 (Conv-1 #), the pooling layer 1 (MaxPool-1), the convolutional layer 2 (Conv-2 #), and the pooling layer 2 (MaxPool-2) in turn.

In this embodiment, the input to the attention mechanism layer 1 (Atten-1) is the feature map output by the pooling layer 2 (MaxPool-2) and the attention matrix $A_{ij}$ corresponding to the sample set $\tilde{X}_{ij}$, and in the attention mechanism layer 1 (Atten-1), a matrix addition operation on the output of the average pooling and the output of the maximum pooling of the feature map $F_{ij}$ and the attention matrix $A_{ij}$ can be performed and an output is made; and in the convolutional layer 3 (Conv-3 #) and the pooling layer 3 (MaxPool-3), the output of the attention mechanism layer 1 (Atten-1) can be processed to output the corresponding feature map.

In this embodiment, the input to the attention mechanism layer 2 (Atten-2) is the feature map output by the pooling layer 3 (MaxPool-3) and the attention matrix Auf corresponding to the sample set $\tilde{X}_{ij}$, and in the attention mechanism layer 2 (Atten-2), a matrix addition operation on the output of the average pooling and the output of the maximum pooling of the corresponding input feature map and the attention matrix $A_{ij}$ can be performed and an output is made; and then, the feature maps incorporating a priori knowledge are output after the processing of the convolutional layer 4 (Conv-4 #) and the pooling layer 4 (MaxPool-4).

In the example, after the processing of the fully connected layer (FC-1*) and the output layer (Softmax), the probability that the input data belongs to each different state may be better output, thereby performing data diagnosis.

In this embodiment, after the 2D-CNN model is constructed, it is trained based on the Adam algorithm, and a learning rate can be set to 0.0001, and the number of batch samples is 100; and in addition, a mean square error (MSE) loss can be used as an optimized objective function.

Figure 3:
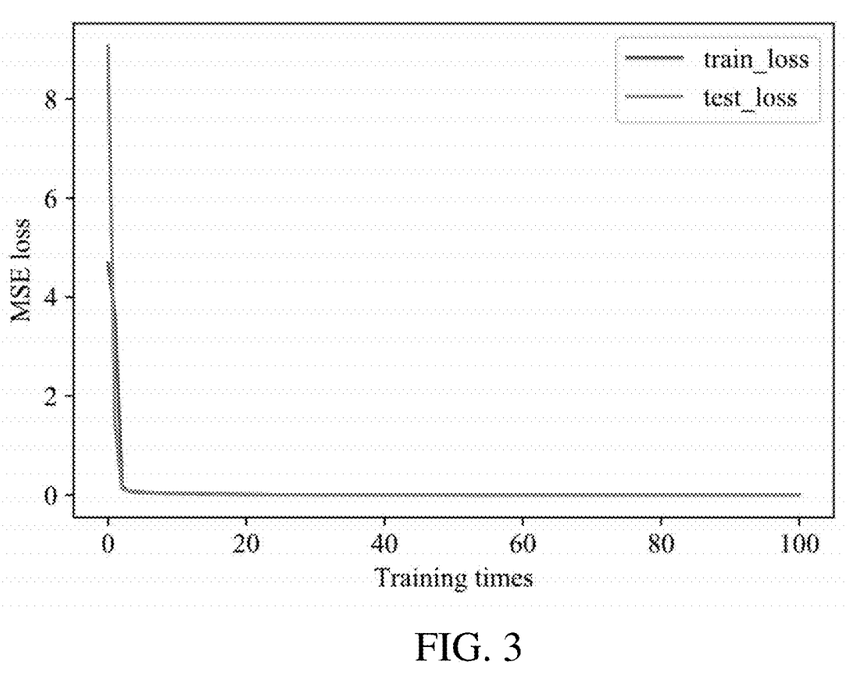
FIG. 3 is a diagram of a mean square error loss of a model in training and testing processes changing with training times in Embodiment 1.

The change of the mean square error loss (MSE loss) in training and testing processes with the training times is shown in FIG. 3, and it can be learned that in the change with

TABLE 1

Model parameter settings

| | Network layer | Input data specification | Output data specification | Convolution kernel/Step size/Zero padding |
|---|---|---|---|---|
| Feature extractor | Conv-1# | 1 × D × 52 | 3 × D × 52 | 7 × 7/1/3 |
| | MaxPool-1 | 3 × D × 52 | 3 × D × 52 | 7 × 7/1/1 |
| | Conv-2# | 3 × D × 52 | 5 × D × 52 | 3 × 3/1/1 |
| | MaxPool-2 | 5 × D × 52 | 5 × D × 52 | 3 × 3/1/1 |
| | Atten-1 | 5 × D × 52/D × 52 | 5 × D × 52 | — |
| | Conv-3# | 5 × D × 52 | 10 × D × 52 | 3 × 3/1/1 |
| | MaxPool-3 | 10 × D × 52 | 10 × D × 52 | 3 × 3/1/1 |
| | Atten-2 | 10 × D × 52/D × 52 | 10 × D × 52 | — |
| | Conv-4# | 10 × D × 52 | 1 × D × 52 | 3 × 3/1/1 |
| | MaxPool-4 | 1 × D × 52 | 1 × D × 52 | 3 × 3/1/1 |
| Classifier | FC-1* | D * 52 | 22 | — |
| | Softmax | 22 | 22 | — |

Herein, hyperparameters of the 2D-CNN model D=10 and r=0.07, and D is the width of the sliding window processing. Therefore, the 2D-CNN model in this embodiment can be expressed as M(10,0.07).

the training times, a training loss (train_loss) and a test loss (test_loss) finally both converge to 0, which indicates that there is no overfitting.

Figure 4:
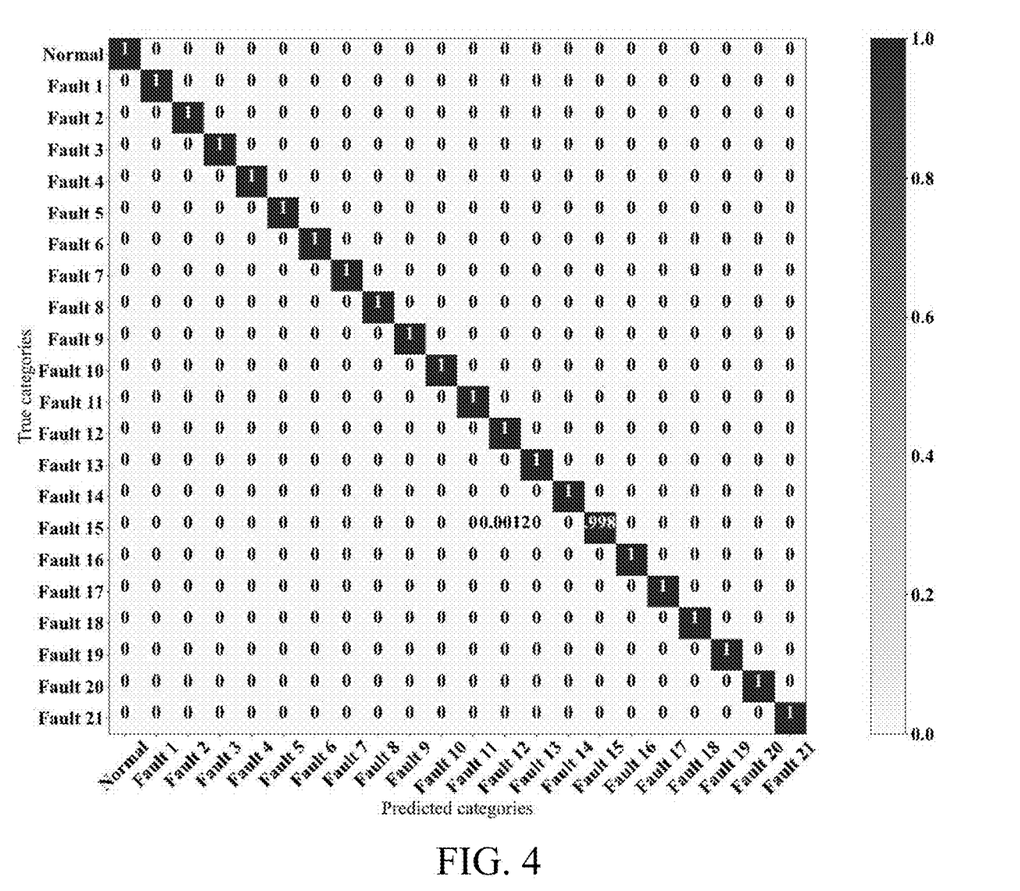
FIG. 4 is a result of an operation of the model on a test set in Embodiment 1.

The result of using the 2D-CNN model in this embodiment to operate on the test set is shown in FIG. 4, and it can be learned that except that a small number of samples of fault 11 (accounting for 0.13%) are incorrectly predicted as fault 15, all other classes of samples can be accurately predicted, and therefore, the method of this embodiment can have relatively good accuracy.

In addition, this embodiment provides the comparison results in terms of the fault diagnosis rate (FDR) and false positive rate (FPR) between the algorithm in this embodiment and the existing DL algorithm, EDBN-2 algorithm, MPLS algorithm, and PCA algorithm.

TABLE 2

Comparison between the model (M(10, 0.07)) in this embodiment and other fault diagnosis models

| Categories | FDR (%) | | | | | FPR (%) | |
|---|---|---|---|---|---|---|---|
| | M(10, 0.07) | DL | EDBN-2 | MPLS | PCA | M(10, 0.07) | EDBN-2 |
| Normal | 100.00 | — | 90.80 | — | 86.25 | 0.00 | 3.34 |
| Fault 1 | 100.00 | 100.00 | 100.00 | 100.00 | 96.56 | 0.00 | 0.00 |
| Fault 2 | 100.00 | 99.75 | 100.00 | 98.88 | 96.88 | 0.00 | 0.08 |
| Fault 3 | 100.00 | — | — | 18.75 | — | 0.00 | — |
| Fault 4 | 100.00 | 100.00 | 100.00 | 100.00 | 96.88 | 0.00 | 0.01 |
| Fault 5 | 100.00 | 98.88 | 100.00 | 100.00 | 96.88 | 0.00 | 0.00 |
| Fault 6 | 100.00 | 100.00 | 100.00 | 100.00 | 99.48 | 0.00 | 0.00 |
| Fault 7 | 100.00 | 100.00 | 100.00 | 100.00 | 99.27 | 0.00 | 0.00 |
| Fault 8 | 100.00 | 97.88 | 98.29 | 98.63 | 94.90 | 0.00 | 0.22 |
| Fault 9 | 100.00 | — | — | 12.13 | — | 0.00 | — |
| Fault 10 | 100.00 | 99.25 | 80.81 | 91.13 | 87.81 | 0.00 | 0.67 |
| Fault 11 | 100.00 | 89.25 | 99.74 | 83.25 | 77.81 | 0.01 | 0.00 |
| Fault 12 | 100.00 | 99.75 | 100.00 | 99.88 | 97.81 | 0.00 | 0.00 |
| Fault 13 | 100.00 | 99.75 | 91.98 | 95.50 | 79.17 | 0.00 | 0.00 |
| Fault 14 | 100.00 | 95.13 | 100.00 | 100.00 | 98.23 | 0.00 | 0.00 |
| Fault 15 | 99.88 | — | — | 23.25 | — | 0.00 | — |
| Fault 16 | 100.00 | 99.50 | 75.56 | 94.28 | 79.90 | 0.00 | 0.67 |
| Fault 17 | 100.00 | 99.75 | 100.00 | 97.13 | 86.46 | 0.00 | 0.00 |
| Fault 18 | 100.00 | 99.50 | 93.43 | 91.25 | 72.81 | 0.00 | 0.00 |
| Fault 19 | 100.00 | 96.75 | 95.53 | 94.25 | 91.56 | 0.00 | 0.27 |
| Fault 20 | 100.00 | 99.38 | 93.17 | 91.50 | 88.54 | 0.00 | 0.00 |
| Fault 21 | 100.00 | — | 83.44 | 72.75 | 95.00 | 0.00 | 1.17 |
| Average | 99.99 | — | 94.31 | — | — | 0.01 | 5.69 |

It can be learned from Table 2 that the algorithm in this embodiment not only achieves significant FDR and FPR performance improvement on general classes, but also can accurately classify the classes that are difficult to identify in previous studies (such as fault 3, fault 9, and fault 15). This result shows that the model proposed in this embodiment is significantly better than other fault diagnosis models.

The present invention and implementations thereof have been described above schematically, and the description is not restrictive, and what is shown in the accompanying drawings is only one of the implementations of the present invention, and an actual structure is not limited thereto. Therefore, if those of ordinary skill in the art are inspired by it and design a structural mode and embodiment similar to the technical solution without creativity without departing from the purpose of creation of the present invention, all structural mode and embodiment shall fall within the scope of protection of the present invention.

The invention claimed is:

1. A deep learning fault diagnosis method incorporating a priori knowledge, the method comprising
processing, a fault diagnosis data set X based on sliding window processing, to obtain a picture-like sample data set $\tilde{X}$, and an attention matrix A of the picture-like sample data set $\tilde{X}$;
constructing, a two-dimensional Convolutional Neural Network (2D-CNN) model to process the picture-like sample data set $\tilde{X}$ to obtain a corresponding feature map F,
processing the feature map F based on channel-oriented average pooling and channel-oriented maximum pooling to obtain an output $P_1$ of the average pooling and an output $P_2$ of the maximum pooling,
obtaining a weight matrix W based on the attention matrix A, the output $P_1$ of the average pooling, and the output $P_2$ of the maximum pooling, wherein an output of the 2D-CNN model is a feature map $\tilde{F}$ based on an attention mechanism, and wherein $\tilde{F}=WF$;
using the 2D-CNN model to predict a new data sample, and determine a state of the new data sample based on the prediction result.

2. The deep learning fault diagnosis method incorporating a priori knowledge according to claim 1, wherein the fault diagnosis data set is $X=\{X_i|i=1,\ldots,M\}$, $X_i \in R^{T \times N}$, wherein $X_i$ is a multi-attribute time series of an $i^{th}$ class of fault, $X_i$ is used to record values of different attributes at different times, M is a total number of fault classes, T is a length of the time series, and N is a total number of attributes.

3. The deep learning fault diagnosis method incorporating a priori knowledge according to claim 2, wherein the picture-like sample data set $\tilde{X}$ is $$\tilde{X} = \left\{\tilde{X}_{ij} \mid i=1,\ldots,M; j=1,\ldots,\left\lfloor\frac{T-D}{\lambda}\right\rfloor\right\}, \tilde{X}_{ij} \in R^{D \times N},$$

wherein $\tilde{X}_{ij}$ represents a $j^{th}$ sample set of the $i^{th}$ class of fault, D is a width of a sliding window, $\lambda$ is a step size of the sliding window, and $\lfloor * \rfloor$ is a rounding up operation.

4. The deep learning fault diagnosis method incorporating a priori knowledge according to claim 3, wherein an attention matrix corresponding to each sample set, $\tilde{X}_{ij}$ is $A_{ij}$, $A_{ij} \in R^{D \times N}$, and the attention matrix $A_{ij}$ is a 0-1 matrix and is used to characterize a priori knowledge.

5. The deep learning fault diagnosis method incorporating a priori knowledge according to claim 4, wherein the attention matrix $A_{ij}$ for each sample set $\tilde{X}_{ij}$ is obtained through threshold characterization, wherein for the $j^{th}$ sample set $\tilde{X}_{ij}$ of the $i^{th}$ class of fault, a value of each element in the sample set $\tilde{X}_{ij}$ is denoted as 1 when each element reaches a threshold to characterize that the $i^{th}$ fault has occurred, otherwise a value of each element in the sample set $\tilde{X}_{ij}$ is denoted as 0.

6. The deep learning fault diagnosis method incorporating a priori knowledge according to claim 4, wherein all the sample sets $\tilde{X}_{ij}$ are processed singly based on the 2D-CNN model while keeping a number of rows and a number of columns unchanged after processing, wherein an output of the sample set $\tilde{X}_{ij}$ is a feature map $F_{ij}$, $F_{ij}=[F_{ij1}, \ldots, F_{ijK}]$, and K is a number of channels of the 2D-CNN model.

7. The deep learning fault diagnosis method incorporating a priori knowledge according to claim 6, wherein the sample set $\tilde{X}_{ij}$, is calculated based on an output $P_{ij1}$ of the average pooling according to:

$$P_{ij1}[d, n] = s\left(\frac{1}{K}\sum_{k=1}^{K}F_k[d, n]\right), d = 1, \ldots, D; n = 1, \ldots, N;$$

and an output $P_{ij2}$ of the maximum pooling according to:

$$P_{ij2}[d, n] = s\left(\max_{k \in \{1,\ldots,K\}} F_k[d, n]\right), d = 1, \ldots, D; n = 1, \ldots, N.$$

8. The deep learning fault diagnosis method incorporating a priori knowledge according to claim 7, wherein the feature map $F_{ij}$, is calculated using a weight matrix $W_{ij}$ wherein:

$$Y = A_{ij} + P_1 + P_2; \text{ and}$$

$$W[d, n] = \frac{e^{Y[d,n]}}{\sum_{d=1}^{D}\sum_{n=1}^{N}e^{Y[d,n]}},$$

wherein W[d, n] represents a value of row d and column n in the matrix $W_{ij}$, and Y[d, n] represents a value of row d and column n in a matrix Y.

* * * * *